No. 645,973. Patented Mar. 27, 1900.
F. RHIND.
LAMP BRACKET.
(Application filed Jan. 6, 1900.)
(No Model.)
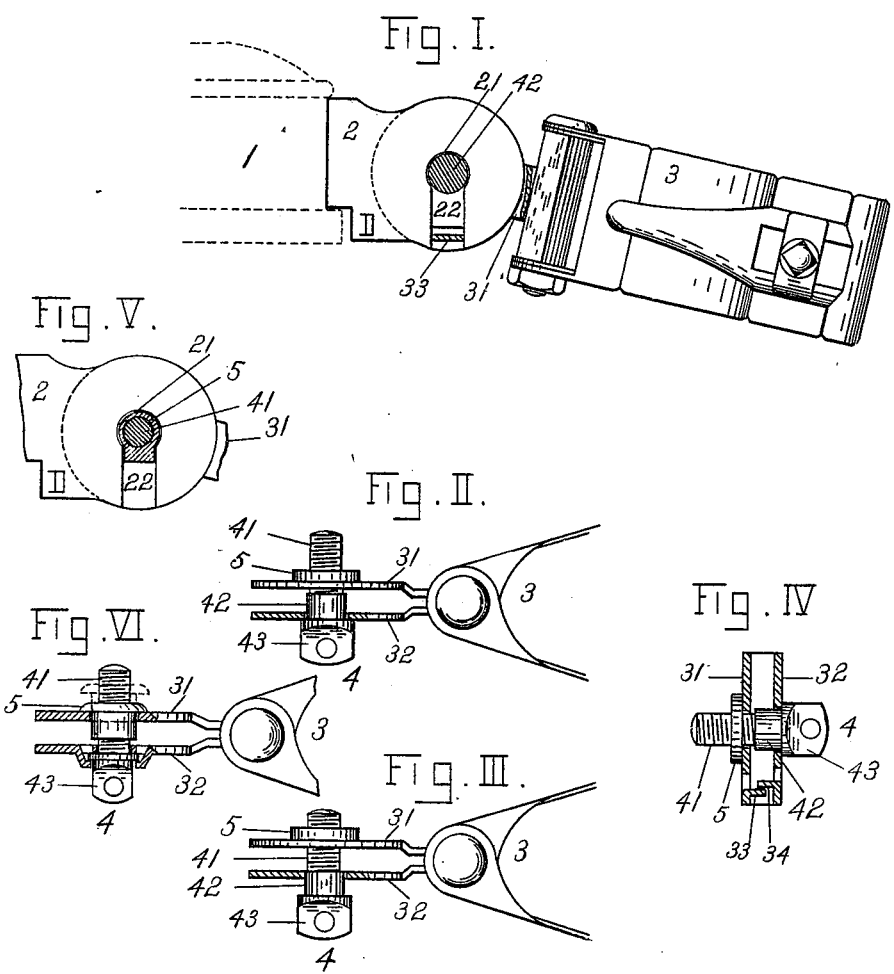
WITNESSES:
E. W. Todd
Geo. W. Baldwin.
Frank Rhind
INVENTOR
BY Geo. L. Cooper
ATTORNEY

United States Patent Office.

FRANK RHIND, OF BRIDGEPORT, CONNECTICUT, ASSIGNOR OF ONE-HALF TO THE BRIDGEPORT BRASS COMPANY, OF SAME PLACE.

LAMP-BRACKET.

SPECIFICATION forming part of Letters Patent No. 645,973, dated March 27, 1900.

Application filed January 6, 1900. Serial No. 535. (No model.)

*To all whom it may concern:*

Be it known that I, FRANK RHIND, a citizen of the United States, residing at No. 1 Broad street, Bridgeport, Fairfield county, Connecticut, have invented a new and useful Improvement in Lamp-Brackets, of which the following is a specification.

My invention relates to the class of brackets used to detachably secure a lamp to a cycle or other vehicle. It is intended to facilitate the detachment of such lamps when desired and to prevent their accidental displacement.

In the accompanying drawings, Figure I, partly in elevation and partly in vertical section, shows a bracket embodying my invention. Figs. II and III are top plan and horizontal sectional views of a part of the device shown in Fig. I. Fig. IV, partly in front elevation and partly in section, shows the same part. Figs. V and VI, in vertical and horizontal section, respectively, show a modification.

1 designates a lamp-body; 2, a lug formed with central aperture 21 and slot 22; 3, a bracket provided with clamping-plates 31 32, which have lugs 33 34; 4, a bolt consisting of body 41, shoulder 42, and head 43, and 5 a nut.

In the example of my invention illustrated in Figs. I to IV of the drawings the lamp-body 1, indicated in dotted lines, may be of any desired construction. To the body 1 is secured a bracket-lug 2, provided with a central aperture 21 and with a slot 22, leading radially from such aperture and of a width less than the diameter thereof. The portion of the device so far described is similar to that shown in my former United States patent, No. 621,374.

The vehicle-engaging portion 3 of the bracket consists, as shown, of a pair of jaws adapted to engage a portion of a cycle or other vehicle, to the front end of which is adjustably connected a pair of clamping portions 31 32, shown as substantially circular plates adapted to embrace the lug 2 on the lamp 1. Passing centrally through the plates 31 32 and engaging in a nut 5, secured to the plate 31, as shown, is a bolt 4, the body portion 41 of which is of a diameter to pass through the slot 22 in the lug 2. A cylindric shoulder 42 on the bolt 4 is of a diameter to fairly fit the aperture 21 of the lug 2. The shoulder 42 may, if desired, be a loose sleeve on the bolt. A flattened head 43 on the bolt 4 affords convenient means for turning the bolt and drawing together the plates 31 32. Inturned lugs 33 34 on the plates 31 32, respectively, are clearly shown in Figs. I and IV. It will be seen that these are formed by bending inward a tongue of metal from each plate. They are of a width to substantially fit the slot 21.

The operation of my device will be readily understood from an inspection of the drawings. It is clear that when the bolt 4 is tightened up to the position shown in Figs. I and II the lug 2 will be firmly held between the plates 31 32 and will be prevented from turning therein by the engagement of the lugs 33 34 in the slot 21. It is also clear that no jar or vibration can act to disengage the lamp from the portion 3 of the bracket, as the shoulder or sleeve 42 cannot pass through the slot 22 in the lug 2. By unscrewing the bolt 4 to the position shown in Fig. III the plates 31 32 are permitted to slightly spring apart and the shoulder 42 of the bolt is retracted so that the lug 2 may be raised from between the plates, the body 41 of the bolt passing readily through the slot 22 and the lamp disengaged from the bracket.

In the modified form of my device shown in Figs. V and VI of the drawings the body 41 of the bolt extends to the head 43, the shoulder 42 being omitted. A collar and engaging lugs, as shown, or other convenient means are provided to prevent other than rotary motion of the bolt 4 in the plate 32. The nut 5 is shown as having a body portion, the cross-section of which is that of a cylinder formed with a radial extension. The cylindric portion passes snugly through the aperture 21 in the lug 2 and the extension passes into the slot 22 in the lug. The nut 5 passes through a suitable slot in the plate 31, so that it is restrained from rotary and free as to longitudinal motion.

It is clear that when the bolt is set home, as shown in full lines, Fig. VI, the lug 2 will be held firmly between the plates 31 32, the nut-body entering the aperture 21 and being too large to pass through the slot 22. Loosening the bolt 4 drives the nut back to the position shown in dotted lines, Fig. VI, in which position the lug 2 is easily disengaged, the slot 22 passing the bolt-body 41. It is obvious that in this construction the tongues 33 34 may be omitted, the nut 5 serving to prevent relative rotation of the lug and clamping-plate.

I am aware that many mechanical alterations may be made in my device without departing from my invention and that parts of my device may be separately used—e. g., the lugs 33 34 would be useful with the form of bolt and nut shown in United States Patent No. 621,374 above named or, conversely, any other form of preventing the relative rotation of the lug 2 and the plates 31 32 may be used with the shouldered bolt or nut herein shown.

What I claim is—

1. A lamp-bracket in two parts one of which is integral with or secured to the lamp-body, the other adapted to engagement with a cycle or other vehicle, one of said parts being a lug provided with an aperture and a relatively-narrow slot leading therefrom, the other part provided with a clamping portion adapted to engage with said lug in combination with means for clamping said lug and said clamping portion together said clamping means being provided with a retractable portion adapted to pass into said aperture in said lug when in its operative position and to be withdrawn therefrom to permit the disengagement of said lug and said clamping portion, substantially as described.

2. A lamp-bracket in two parts one of which is integral with or secured to the lamp-body, the other adapted to engagement with a cycle or other vehicle, one of said parts being a lug provided with an aperture and a relatively-narrow slot leading therefrom, the other part provided with a clamping portion adapted to engage with said lug in combination with a bolt and nut for clamping said lug and said clamping portion together, and a retractable portion adapted to pass into said aperture in said lug when in its operative position and to be withdrawn therefrom to permit the disengagement of said lug and said clamping portion, substantially as described.

3. A lamp-bracket in two parts one of which is integral with or secured to a lamp-body, the other adapted to engagement with a cycle or other vehicle, one of said parts being a lug provided with an aperture and a relatively-narrow slot leading therefrom, the other part provided with a clamping portion adapted to engage with said lug in combination with a retractable transverse bolt passing through said lug, a portion of said bolt being of a diameter greater than the width of said slot and adapted to pass into said aperture, substantially as described.

4. A lamp-bracket in two parts one of which is integral with or secured to the lamp-body, the other adapted to engagement with a cycle or other vehicle, one of said parts being a lug provided with an aperture and a relatively-narrow slot leading therefrom, the other part provided with clamping portions adapted to embrace said lug in combination with a retractable clamping-bolt adapted to secure said clamping portions upon said lug said bolt being adapted in its operative position to substantially fill said aperture and in its retracted position to pass said slot, substantially as described.

5. A lamp-bracket in two parts one of which is integral with or secured to the lamp-body, the other adapted to engagement with a cycle or other vehicle, one of said parts being a lug provided with an aperture and a relatively-narrow slot leading therefrom, the other part provided with clamping portions adapted to embrace said lug in combination with a retractable clamping-bolt adapted to secure said clamping portions upon said lug said bolt being provided with a shoulder adapted to substantially fill said aperture and with a body portion adapted to pass said slot, substantially as described.

6. A lamp-bracket in two parts one of which is integral with or secured to a lamp-body, the other adapted to engagement with a cycle or other vehicle, one of said parts being a lug provided with an aperture and a slot leading therefrom the other part provided with clamping portions adapted to embrace said lug at least one of said clamping portions being provided with an integral inturned tongue adapted to enter said slot in combination with means for clamping said portions upon said lug, substantially as described.

7. In a lamp-bracket in combination a lug provided with a central aperture and a relatively-narrow slot leading therefrom, a pair of clamping-plates adapted to embrace said lug, a bolt having threaded engagement with one of said plates, passing through said lug and through the other of said plates and having a body portion of a diameter corresponding to the width of said slot and a shoulder of a diameter corresponding to the diameter of said central aperture and a pair of vehicle-engaging jaws adjustably connected with said clamping-plates, substantially as described.

8. In a lamp-bracket in combination a lug provided with a central aperture and a relatively-narrow slot leading therefrom, a pair of clamping-plates adapted to embrace said lug and provided one or both with integral inturned tongues adapted to enter said slot, a bolt having threaded engagement with one of said plates, passing through said lug and through the other of said plates and having a body portion of a diameter corresponding to the width of said slot and a shoulder of a diameter corresponding to the diameter of said central aperture and a pair of vehicle-engaging jaws adjustably connected with said clamping-plates, substantially as described.

FRANK RHIND.

Witnesses:
  GEO. L. COOPER,
  NETTIE S. WELLS.